United States Patent
Kanada

(10) Patent No.: US 11,062,443 B2
(45) Date of Patent: Jul. 13, 2021

(54) SIMILARITY DETERMINATION APPARATUS, SIMILARITY DETERMINATION METHOD, AND PROGRAM

(71) Applicant: FUJIFILM Corporation, Tokyo (JP)

(72) Inventor: Shoji Kanada, Tokyo (JP)

(73) Assignee: FUJIFILM Corporation, Tokyo (JP)

(*) Notice: Subject to any disclaimer, the term of this patent is extended or adjusted under 35 U.S.C. 154(b) by 159 days.

(21) Appl. No.: 16/528,805

(22) Filed: Aug. 1, 2019

(65) Prior Publication Data

US 2020/0074621 A1 Mar. 5, 2020

(30) Foreign Application Priority Data

Aug. 31, 2018 (JP) .............................. JP2018-162859

(51) Int. Cl.
*G06T 7/00* (2017.01)
*G06K 9/62* (2006.01)

(52) U.S. Cl.
CPC .......... *G06T 7/0012* (2013.01); *G06K 9/6215* (2013.01); *G06K 9/6267* (2013.01);
(Continued)

(58) Field of Classification Search
CPC .................... G06T 7/0012; G06T 7/11; G06T 2207/30096; G06T 2207/10081;
(Continued)

(56) References Cited

U.S. PATENT DOCUMENTS

2005/0149360 A1* 7/2005 Galperin .............. G06K 9/6217
705/2
2009/0129673 A1* 5/2009 Simon ....................... G06T 7/11
382/173
(Continued)

FOREIGN PATENT DOCUMENTS

| JP | 2000-342558 A | 12/2000 |
| JP | 2011-118543 A | 6/2011 |
| WO | 2013-065090 A1 | 5/2013 |

OTHER PUBLICATIONS

Adrien Depeursinge et al., "Case-based lung image categorization and retrieval for interstitial lung diseases: clinical workflow," Int J CARS (2012), vol. 7, pp. 97-110, Published online: Jun. 1, 2011.
(Continued)

*Primary Examiner* — Kim Y Vu
*Assistant Examiner* — Francisco A Agra
(74) *Attorney, Agent, or Firm* — Studebaker & Brackett PC

(57) ABSTRACT

A similarity determination apparatus comprising a processor configured to: classify each pixel of a first medical image into at least one of a plurality of types of findings; calculate a first feature amount for each classified finding; set a weighting coefficient indicating a degree of weighting which varies depending on a size of each finding for each classified finding; derive an adjusted weighting coefficient by adjusting the weighting coefficient for each of a plurality of finding groups, into which the plurality of types of findings are classified; and derive the similarity between the first medical image and a second medical image by performing a weighting operation for the first feature amount for each finding in the first medical image and a second feature amount for each
(Continued)

finding calculated in advance in the second medical image, for each of the finding groups on the basis of the adjusted weighting coefficient.

19 Claims, 9 Drawing Sheets

(52) U.S. Cl.
CPC .............. *G06T 2207/20084* (2013.01); *G06T 2207/30061* (2013.01)

(58) Field of Classification Search
CPC ...... G06T 2207/30061; G06K 2209/05; G16H 30/40; G16H 30/20; G16H 50/20; G16H 50/70
See application file for complete search history.

(56) References Cited

U.S. PATENT DOCUMENTS

| | | | |
|---|---|---|---|
| 2010/0232661 A1* | 9/2010 | Hisanaga | G06K 9/00 382/128 |
| 2013/0006087 A1* | 1/2013 | Kondo | G16H 50/70 600/407 |
| 2013/0114867 A1* | 5/2013 | Kondo | G16H 30/40 382/128 |
| 2016/0306936 A1* | 10/2016 | Mizobe | G16H 50/70 |
| 2016/0350484 A1* | 12/2016 | Son | G16H 70/60 |
| 2017/0116730 A1* | 4/2017 | Yamanaka | G06T 5/008 |
| 2018/0293465 A1* | 10/2018 | Kanada | G06T 7/11 |
| 2018/0293729 A1* | 10/2018 | Hashimoto | A61B 6/03 |
| 2019/0286652 A1* | 9/2019 | Habbecke | G16H 20/40 |

OTHER PUBLICATIONS

Joseph Jacob et al., "Evaluation of computer-based computer tomography stratification against outcome models in connective tissue disease-related interstitial lung disease: a patient outcome study," BMC Medicine (2016), vol. 14, Article No. 190, pp. 1-13, Published Online: Nov. 23, 2016.

Iwasawa Tae, "Quantitative Evaluation of CT Images of Interstitial Pneumonia by Computer," Japanese Journal of Tomography, vol. 41, No. 2, pp. 23-33, Aug. 11, 2014.

* cited by examiner

| TYPE OF FINDING | EVALUATION VALUE |
|---|---|
| INFILTRATIVE SHADOW | 2.9 |
| GROUND-GLASS SHADOW | 7.6 |
| RETICULAR SHADOW | 8.5 (MAXIMUM) |
| BRONCHODILATION | 3.2 |
| . . . | . . . |
| . . . | . . . |
| NORMAL LUNG | -7.1 |
| LOW ABSORPTION AREA (EMPHYSEMA) | -12.3 |

| TYPE OF FINDING | VOLUME |
|---|---|
| GROUND-GLASS SHADOW | 20540 |
| INFILTRATIVE SHADOW | 11210 |
| LOW ABSORPTION AREA | 2890 |
| BRONCHODILATION | 4030 |
| RETICULAR SHADOW | 9680 |
| CYST | 1430 |
| NORMAL LUNG | 157830 |

SIMILARITY DETERMINATION APPARATUS, SIMILARITY DETERMINATION METHOD, AND PROGRAM

CROSS-REFERENCE TO RELATED APPLICATIONS

The present application claims priority under 35 U.S.C. § 119 to Japanese Patent Application No. 2018-162859, filed on Aug. 31, 2018. The above application(s) is hereby expressly incorporated by reference, in its entirety, into the present application.

BACKGROUND OF THE INVENTION

1. Field of the Invention

The present disclosure relates a similarity determination apparatus, a similarity determination method, and a non-transitory computer recording medium storing a program that determines a similarity between two medical images.

2. Description of the Related Art

In recent years, with the progress of medical apparatuses, such as a computed tomography (CT) apparatus and a magnetic resonance imaging (MM) apparatus, high-resolution three-dimensional images with higher quality have been used for image diagnosis.

In the medical field, a similar case search apparatus has been known which searches for past cases similar to an examination image, such as a CT image to be examined, on the basis of the examination image (for example, Case-based lung image categorization and retrieval For interstitial lung diseases: clinical workflow, Adrien Depeursinge, Int J CARS (2012) 7:97-110, Published online: 1 Jun. 2011, WO2013-065090A, and JP2011-118543A). Case-based lung image categorization and retrieval For interstitial lung diseases: clinical workflow, Adrien Depeursinge, Int J CARS (2012) 7:97-110, Published online: 1 Jun. 2011 discloses a method which classifies a case image of the lung into a plurality of regions indicating a plurality of types of tissues or lesions (hereinafter, it is assumed that tissues or lesions are generically referred to as findings), registers the plurality of regions in a case database, similarly classifies an examination image of the lung into a plurality of regions indicating a plurality of types of findings, and searches for a case image similar to the examination image on the basis of the classification result of the findings for the examination image. In addition, WO2013-065090A and JP2011-118543A disclose a method which compares a feature amount of an image, such as a density histogram of the image, the average of density, or a variance of density, with a feature amount of an image registered in a database to search for an image similar to an examination image. Further, as a method for calculating the similarity between images, a method has been proposed which sets a plurality of partial regions in at least one of a plurality of images, determines the similarity between each of the set partial regions and each corresponding region in other images, weights and adds the determined similarities between the partial regions using a weighting coefficient set for each partial region to calculate the overall region similarity (see JP2000-342558A).

However, interstitial pneumonia is known as a lung disease. A method has been proposed which analyzes a CT image of a patient with interstitial pneumonia and classifies and quantifies lesions indicating specific findings, such as honeycomb lung, reticular shadow, and cyst included in the CT image (see Evaluation of computer-based computer tomography stratification against outcome models in connective tissue disease-related interstitial lung disease: a patient outcome study, Joseph Jacobi, BMC Medicine (2016) 14:190, DOI 10.1186/s12916-016-0739-7 and Quantitative Evaluation of CT Images of Interstitial Pneumonia by Computer, Iwasawa Tae, Japanese Journal of Tomography, vol. 41, No. 2, August 2014). The method which analyzes a CT image and classifies and quantifies lesions makes it possible to easily determine the degree of lung disease. In addition, different colors are assigned to the classified and quantified regions and the regions are displayed, which makes it possible to easily diagnose how much a specific symptom region is included in the image.

It is necessary to detect a structure in a three-dimensional image in order to extract a structure, such as an organ of interest, from a three-dimensional image such as a CT image. Here, a deep learning method has been proposed in order to classify the pixels of interest in an image into a plurality of classes. The deep learning is a machine learning method using a multi-layer neural network constructed by hierarchically connecting a plurality of processing layers.

In the deep learning, in each layer of the multi-layer neural network, arithmetic processing is performed for a plurality of different calculation result data items obtained by the previous layer for input data, that is, data of the extraction result of feature amounts. Then, arithmetic processing in the subsequent processing layers is performed for the obtained data of the feature amounts. Therefore, it is possible to improve the recognition rate of the feature amounts and to classify input data into a plurality of classes.

It is considered that the deep learning method is applied to the above-mentioned three-dimensional image to classify each pixel of the three-dimensional image into a plurality of classes. For example, in a case in which a plurality of types of structures included in a three-dimensional image are classified, deep learning is performed for a neural network, using a three-dimensional image as an input, such that pixels to be processed in the three-dimensional image are classified into any one of a plurality of types of structures. The neural network subjected to the deep learning in this way is used to classify the pixels to be processed in the input three-dimensional image into any one of a plurality of types of structures.

SUMMARY OF THE INVENTION

The methods disclosed in Case-based lung image categorization and retrieval For interstitial lung diseases: clinical workflow, Adrien Depeursinge, Int J CARS (2012) 7:97-110, Published online: 1 Jun. 2011, WO2013-065090A, JP2011-118543A, and JP2000-342558A are used to search for a case image similar to a lesion included in the lung in the examination image. The importance of a characteristic finding included in the examination image varies depending on the size and type of the finding.

The present disclosure has been made in view of the above-mentioned problems and an object of the present disclosure is to provide a technique that can appropriately determine a similarity between images on the basis of the size and type of findings included in the image.

According to an aspect of the present disclosure, there is provided a similarity determination apparatus that determines a similarity between a first medical image and a second medical image. The similarity determination apparatus comprises: a finding classification unit that classifies each pixel of the first medical image into at least one of a plurality of types of findings; a feature amount calculation unit that calculates a first feature amount for each finding classified in the first medical image; a weighting coefficient setting unit that sets a weighting coefficient indicating a degree of weighting which varies depending on a size of each finding for each finding classified in the first medical image; an adjustment unit that adjusts the weighting coefficient for each of a plurality of finding groups, into which the plurality of types of findings are classified, to derive an adjusted weighting coefficient; and a similarity derivation unit that performs a weighting operation for the first feature amount for each finding calculated in the first medical image and a second feature amount for each finding calculated in advance in the second medical image for each of the finding groups on the basis of the adjusted weighting coefficient to derive the similarity between the first medical image and the second medical image.

In the present disclosure, one or more findings are classified into the finding group.

In the similarity determination apparatus according to the present disclosure, the adjustment unit may adjust the weighting coefficient on the basis of a representative value of the weighting coefficients, which have been set for each classification, for each finding group.

In this case, the representative value may be a sum of the weighting coefficients, which have been set for each classification, for each finding group.

In the similarity determination apparatus according to the present disclosure, the adjustment unit may adjust the weighting coefficient in response to a command to change a degree of adjustment of the weighting coefficient.

In this case, the adjustment unit may receive a command to change the weighting coefficient displayed on a display unit and adjust the weighting coefficient.

In this case, the adjustment unit may be a slider.

In the similarity determination apparatus according to the present disclosure, the plurality of finding groups may include a finding group that becomes a background included in the first medical image and a finding group that becomes an important finding included in the first medical image.

In the similarity determination apparatus according to the present disclosure, the plurality of types of findings may include at least one specific finding that is classified into two or more finding groups.

The adjustment unit may perform weighting corresponding to relevance to the two or more finding groups for the specific finding to adjust the weighting coefficient.

In the similarity determination apparatus according to the present disclosure, the finding classification unit may include a discriminator that has been subjected to machine learning so as to classify the plurality of types of findings and classify each pixel of the first medical image into the plurality of types of findings using the discriminator.

The similarity determination apparatus according to the present disclosure may further comprise a search unit that searches for a second medical image similar to the first medical image as a similar medical image on the basis of similarities between the first medical image and a plurality of the second medical images with reference to a case database in which the plurality of second medical images are registered and the second feature amounts for each of the plurality of second medical images are registered so as to be associated with the plurality of second medical images.

The similarity determination apparatus according to the present disclosure may further comprise a display control unit that displays a search result of the similar medical image on the display unit.

In the similarity determination apparatus according to the present disclosure, the finding classification unit may calculate a plurality of evaluation values indicating a possibility of each pixel of the first medical image being each of the plurality of types of findings and classify each pixel of the first medical image into at least one of the plurality of types of findings on the basis of the plurality of evaluation values.

According to the present disclosure, there is provided a similarity determination method that determines a similarity between a first medical image and a second medical image. The similarity determination method comprises: classifying each pixel of the first medical image into at least one of a plurality of types of findings; calculating a first feature amount for each finding classified in the first medical image; setting a weighting coefficient indicating a degree of weighting which varies depending on a size of each finding for each finding classified in the first medical image; adjusting the weighting coefficient for each of a plurality of finding groups, into which the plurality of types of findings are classified, to derive an adjusted weighting coefficient; and performing a weighting operation for the first feature amount for each finding calculated in the first medical image and a second feature amount for each finding calculated in advance in the second medical image for each of the finding groups on the basis of the adjusted weighting coefficient to derive the similarity between the first medical image and the second medical image.

In addition, a non-transitory computer recording medium storing a program that causes a computer to perform the similarity determination method according to the present disclosure may be provided.

Another similarity determination apparatus according to the invention comprises a memory that stores commands to cause a computer to perform a process of determining a similarity between a first medical image and a second medical image and a processor that is configured to execute the stored commands. The processor performs a process of classifying each pixel of the first medical image into at least one of a plurality of types of findings; a process of calculating a first feature amount for each finding classified in the first medical image; a process of setting a weighting coefficient indicating a degree of weighting which varies depending on a size of each finding for each finding classified in the first medical image; a process of adjusting the weighting coefficient for each of a plurality of finding groups, into which the plurality of types of findings are classified, to derive an adjusted weighting coefficient; and a process of performing a weighting operation for the first feature amount for each finding calculated in the first medical image and a second feature amount for each finding calculated in advance in the second medical image for each of the finding groups on the basis of the adjusted weighting coefficient to derive the similarity between the first medical image and the second medical image.

According to the present disclosure, it is possible to appropriately determine the similarity between the first medical image and the second medical image on the basis of the size and type of findings.

DESCRIPTION OF THE PREFERRED EMBODIMENTS

Figure 1:
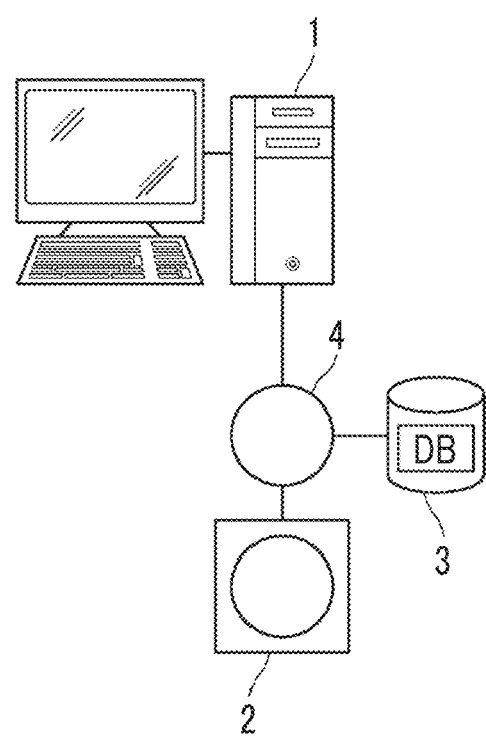
FIG. 1 is a hardware configuration diagram illustrating the outline of a diagnosis support system to which a similarity determination apparatus according to an embodiment of the present disclosure is applied.

Hereinafter, an embodiment of the present disclosure will be described with reference to the drawings. FIG. 1 is a hardware configuration diagram illustrating the outline of a diagnosis support system to which a similarity determination apparatus according to an embodiment of the present disclosure is applied. As illustrated in FIG. 1, in the diagnosis support system, a similarity determination apparatus 1 according to this embodiment, a three-dimensional imaging apparatus 2, and an image storage server 3 are connected so as to communicate with each other through a network 4.

The three-dimensional imaging apparatus 2 captures an image of a part of a subject to be diagnosed and generates a three-dimensional image indicating the part. Specifically, the three-dimensional imaging apparatus 2 is, for example, a CT apparatus, an MM apparatus, and a positron emission tomography (PET) apparatus. The three-dimensional image including a plurality of slice images generated by the three-dimensional imaging apparatus 2 is transmitted to the image storage server 3 and is then stored therein. In this embodiment, a diagnosis target part of a patient that is the subject is the lung the three-dimensional imaging apparatus 2 is a CT apparatus and generates a chest CT image including the lung of the subject as a three-dimensional image.

The image storage server 3 is a computer that stores and manages various types of data and comprises a high-capacity external storage device and database management software. The image storage server 3 performs communication with other apparatuses through the wired or wireless network 4 to transmit and receive, for example, image data. Specifically, the image storage server 3 acquires various types of data including image data of the three-dimensional image generated by the three-dimensional imaging apparatus 2 through the network, stores the acquired data in a recording medium, such as a high-capacity external storage device, and manages the data. In addition, the storage format of the image data and the communication between the apparatuses through the network 4 are based on a protocol such as Digital Imaging and Communication in Medicine (DICOM). In this embodiment, it is assumed that the image storage server 3 stores three-dimensional images to be examined (hereinafter, referred to as examination images) and a case database DB having case images registered therein. The case database DB will be described below. In addition, in this embodiment, the examination image is a three-dimensional image including one or more slice images (hereinafter, referred to as examination slice images). The case image is also a three-dimensional image including one or more slice images (hereinafter, referred to as case slice images). The examination image corresponds to a first medical image and the case image corresponds to a second medical image.

The similarity determination apparatus 1 is configured by installing a similarity determination program according to the present disclosure in one computer. The computer may be a workstation or a personal computer that is directly operated by a doctor for diagnosis or may be a server computer that is connected with them through the network. The similarity determination program is recorded on a recording medium, such as a digital versatile disc (DVD) or a compact disc read only memory (CD-ROM), and is then distributed. The similarity determination program is installed in the computer from the recording medium. Alternatively, the similarity determination program is stored in a storage device of a server computer connected to the network, or is stored in a network storage so as to be accessed from the outside, is downloaded to the computer used by the doctor on request, and is then installed in the computer.

Figure 2:
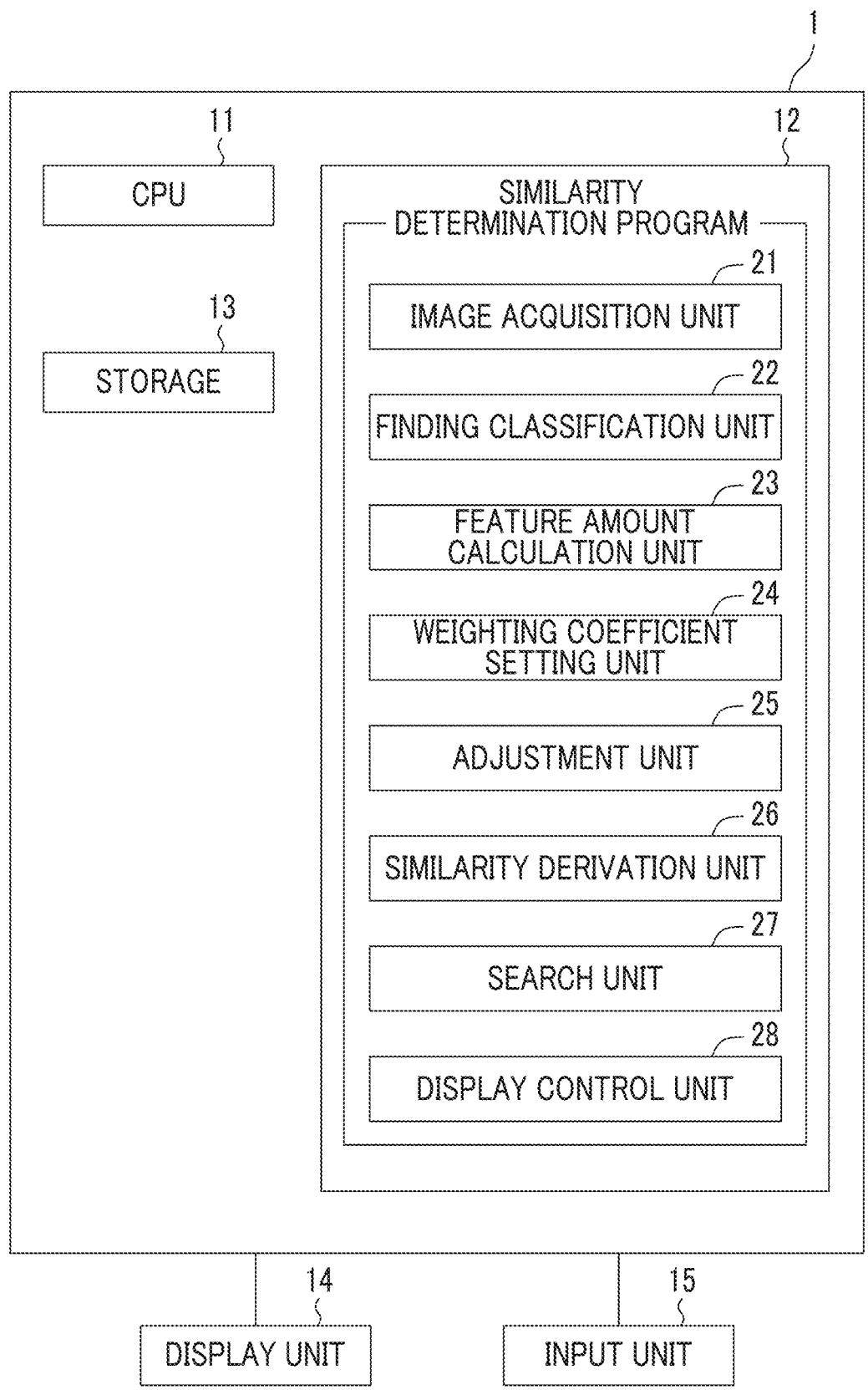
FIG. 2 is a block diagram schematically illustrating the configuration of the similarity determination apparatus according to this embodiment.

FIG. 2 is a diagram schematically illustrating the configuration of the similarity determination apparatus according to the embodiment of the present disclosure which is implemented by installing the similarity determination program in a computer. As illustrated in FIG. 2, the similarity determination apparatus 1 has the configuration of a standard workstation and comprises a central processing unit (CPU) 11, a memory 12, and a storage 13. In addition, a display unit 14 including, for example, a liquid crystal display and an input unit 15 including, for example, a keyboard and a mouse are connected to the similarity determination apparatus 1.

The storage 13 includes, for example, a hard disk drive and a solid state drive (SSD). The storage 13 stores various kinds of information which include an examination image of the subject and information required for processes and are acquired from the image storage server 3 through the network 4.

Further, the memory 12 stores the similarity determination program. The similarity determination program defines the following processes as the processes performed by the CPU 11: an image acquisition process that acquires an examination image to be examined; a finding classification process that classifies each pixel of the examination image into at least one of a plurality of types of findings; a feature amount calculation process that calculates a first feature amount for each finding classified in the examination image; a weighting coefficient setting process that sets a weighting coefficient indicating the degree of weighting which varies depending on the size of the finding; an adjustment process which adjusts the weighting coefficient for each of a plurality of finding groups into which the plurality of types of findings are classified to derive an adjusted weighting coefficient; a similarity derivation process that performs a weighting operation for the first feature amount for each finding calculated in the examination image and a second feature amount for each finding which has been calculated in a case image in advance in accordance with the adjusted weighting coefficient to derive the similarity between the examination image and the case image; a search process that searches for a case image similar to the examination image on the basis of the derived similarity; and a display control process that displays the search result on the display unit 14.

Then, the CPU 11 performs these processes according to the program such that the computer functions as an image acquisition unit 21, a finding classification unit 22, a feature amount calculation unit 23, a weighting coefficient setting unit 24, an adjustment unit 25, a similarity derivation unit 26, a search unit 27, and a display control unit 28.

The image acquisition unit 21 acquires an examination image V0 of the subject to be examined. In a case in which the examination image V0 has been stored in the storage 13, the image acquisition unit 21 acquires the examination image V0 from the storage 13.

The finding classification unit 22 classifies each pixel of a lung region included in the examination image V0 into at least one of a plurality of types of findings. Specifically, the finding classification unit 22 calculates a plurality of evaluation values indicating the possibility that each pixel of the lung region included in the examination image V0 will be each of a plurality of types of tissues or lesions (for example, findings) and classifies each pixel of the examination image V0 into at least one of the plurality of types of findings on the basis of the plurality of evaluation values. In this embodiment, it is assumed that the finding classification unit 22 classifies each pixel of the examination image V0 into one finding.

The finding classification unit 22 according to this embodiment includes a discriminator which is a multi-layer neural network generated by deep learning (deep learning) that is one kind of machine learning and specifies the type of finding, to which each pixel of the examination image V0 belongs, using the discriminator. The machine learning method is not limited to deep learning and other methods including a support vector machine may be used.

In the multi-layer neural network, in each layer, arithmetic processing is performed for data of a plurality of different feature amounts obtained by the previous layer, using various kernels. Then, in the subsequent layers, arithmetic processing is further performed for the data of the feature amounts obtained by the arithmetic processing to improve the recognition rate of the feature amounts and the input data can be classified into a plurality of classes.

In this embodiment, the multi-layer neural network receives the examination image V0 and outputs the result of the classification of the lung region into a plurality of types of findings. However, the multi-layer neural network may receive each of a plurality of examination slice images forming the examination image V0 and output the result of the classification of the lung region into a plurality of types of findings.

Figure 3:
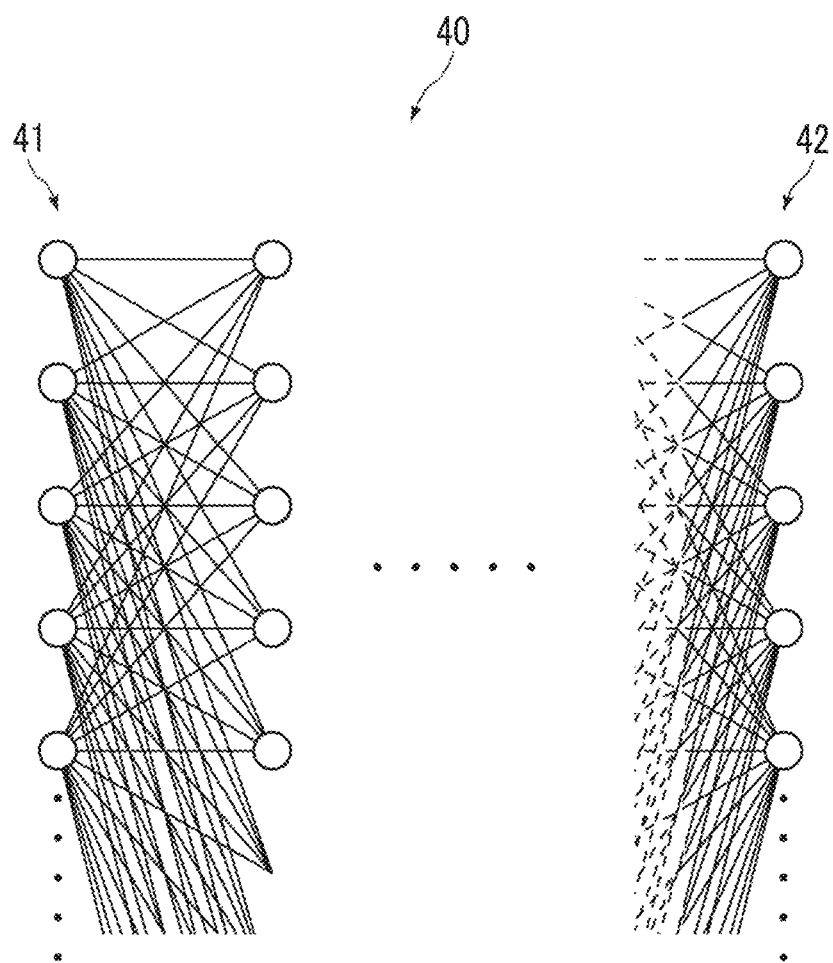
FIG. 3 is a diagram illustrating an example of a multi-layer neural network.

FIG. 3 is a diagram illustrating an example of the multi-layer neural network. As illustrated in FIG. 3, a multi-layer neural network 40 has a plurality of layers including an input layer 41 and an output layer 42. In this embodiment, learning is performed such that the lung region included in the examination image V0 is classified into a plurality of findings, such as an infiltrative shadow, a mass shadow, a ground-glass shadow, a centrilobular nodular shadow, a non-centrilobular nodular shadow, a punctate shadow, a reticular shadow, a linear shadow, interlobular septal thickening, a honeycomb lung, cyst, a low absorption area (emphysema), emphysema tendency, cavity, pleural thickening, pleural fluid, bronchodilation, traction bronchiectasis, a blood vessel, a normal lung, a chest wall, and mediastinum. In addition, the type of finding is not limited thereto. For example, the number of findings may be larger or smaller than that.

In this embodiment, the multi-layer neural network 40 learns these findings using about millions of teacher data. At the time of learning, a region of interest with a predetermined size (for example, 1.5 cm×1.5 cm) is cut out from a cross-sectional image in which the types of findings have been known and the region of interest is used as teacher data. Then, the teacher data is input to the multi-layer neural network 40 and the result of a finding type classification process (hereinafter, referred to as a classification result) is output from the multi-layer neural network 40. Then, the output result is compared with the teacher data and the weight of the connection between the layers of units (represented by circles in FIG. 3) included in each layer of the multi-layer neural network 40 is corrected from the output side to the input side according to whether the answer is correct or incorrect. The correction of the weight of the connection is repeated using a large amount of teacher data a predetermined number of times or until the accuracy rate of the output classification result reaches 100% and the learning ends.

In a case in which the input image is an examination slice image, in the learning of the multi-layer neural network 40, a two-dimensional region normalized to a predetermined size (for example, 1.5 cm×1.5 cm) is cut out from a slice image forming a three-dimensional image in which a lesion has been known and the image of the cut-out two-dimensional region is used as the teacher data.

The finding classification unit 22 extracts a lung region that is a target region from the examination image V0 for classification. Any method, such as a method that creates a histogram of the signal values of each pixel of the examination image V0 and performs threshold processing for the lung to extract the lung region or a region growing method based on a seed point indicating the lung, may be used as a method of extracting the lung region. In addition, a discriminator which has been subjected to machine learning so as to extract the lung region may be used.

In the finding classification process, the finding classification unit 22 sequentially cuts out the region of interest having the same size as the teacher data from the lung region of the examination image V0 and inputs the region of interest to the discriminator formed by the multi-layer neural network 40. Then, for a central pixel of the cut region of interest, an evaluation value corresponding to each classification of the findings is output. The evaluation value corresponding to each classification indicates the possibility that the central pixel will belong to each classification. As the evaluation value becomes larger, the possibility of the central pixel belonging to the classification becomes higher.

Figures 4, 5:
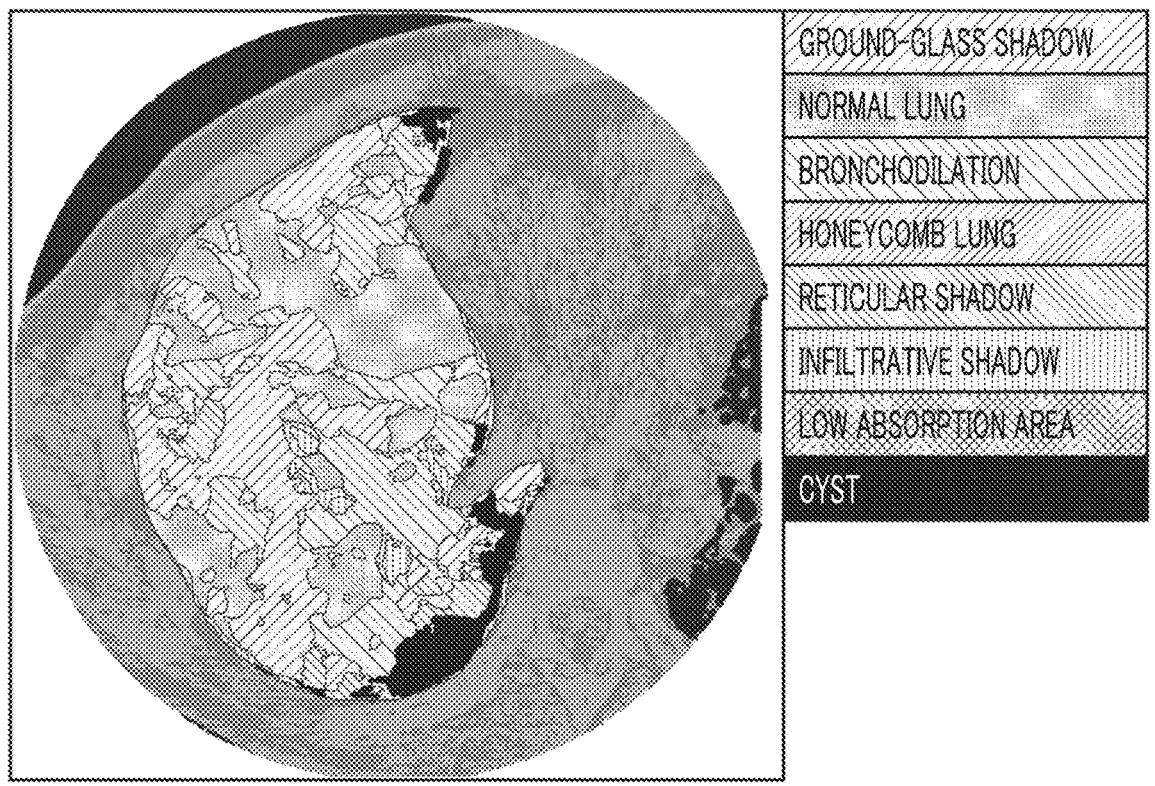
FIG. 4 is a diagram illustrating an evaluation value corresponding to the type of finding for a center pixel in a certain region of interest.
FIG. 5 is a diagram illustrating a cross section of a mapping image to which colors corresponding to classifications are assigned.

FIG. 4 is a diagram illustrating an evaluation value corresponding to the type of finding for a central pixel of a certain region of interest. In FIG. 4, evaluation values for some findings are illustrated for simplicity of description. In this embodiment, the discriminator classifies the central pixel of the region of interest into a finding with the maximum evaluation value among a plurality of findings. For example, in a case in which the evaluation values illustrated in FIG. 4 are acquired, the central pixel of the region of interest has the highest possibility of being the reticular shadow and has the second highest possibility of being the ground-glass shadow. On the contrary, there is almost no possibility that the central pixel will be the normal lung or the low absorption area. Therefore, in a case in which the evaluation values as illustrated in FIG. 4 are acquired, the central pixel of the region of interest is classified into the reticular shadow having a maximum evaluation value of 8.5 by the finding classification process. In this way, all of the pixels of the lung region included in the examination image V0 are classified into any of a plurality of types of findings.

The finding classification unit 22 sequentially cuts out the same voxel region as the teacher data from the extracted lung region and sequentially inputs the cut-out voxel region to the discriminator of the multi-layer neural network 40 which has been learned as described above. Then, for the central pixel of the extracted region, a plurality of evaluation values for each of a plurality of types of lesion regions are output. The finding classification unit 22 classifies the central pixel of the region input to the multi-layer neural network 40 into a finding with the maximum evaluation value among the plurality of evaluation values and outputs the result of the finding classification process. In this way, all of the pixels of the lung region included in the examination image V0 are classified into any of a plurality of types of findings.

The finding classification unit 22 assigns a color to each classified region of the examination image V0 on the basis of the result of the finding classification process to generate a three-dimensional mapping image. Specifically, the finding classification unit 22 assigns the same color to the pixels classified into the same finding for all of the pixels in a three-dimensional space classified into any of the plurality of types of findings to generate a mapping image. FIG. 5 is a diagram illustrating a cross section of the mapping image in which colors corresponding to a plurality of types of classifications are assigned. FIG. 5 illustrates a mapping image in a case in which the pixels are classified into eight types of findings, that is, a ground-glass shadow, a normal lung, bronchodilatation, a honeycomb lung, a reticular shadow, an infiltrative shadow, a low absorption area, and cyst for simplicity of description. In addition, the display control unit 28 which will be described below may display the mapping image on the display unit 14. In a case in which the mapping image is displayed on the display unit 14, as illustrated in FIG. 5, an image of any cross section in the three-dimensional mapping image may be displayed. However, the invention is not limited thereto and the three-dimensional mapping image may be displayed on the display unit 14.

The feature amount calculation unit 23 calculates a feature amount for each of the classified findings in the examination image V0. Specifically, the feature amount calculation unit 23 calculates, as the feature amount, at least one of the size of a region for each finding, average density for each finding, the variance of density for each finding, the number of regions for each finding, or the average size of the region for each finding. It is assumed that the feature amount calculated for the examination image V0 is referred to as a first feature amount. The size of the region for each finding, the number of regions for each finding, and the average size of the region for each finding are size feature amounts. The volume of the region for each finding can be used as the size of the region for each finding.

In addition, a file name, evaluation values for a plurality of findings in each pixel, and feature amounts for each finding are registered for each of a plurality of case images in the above-described case database DB. It is assumed that the feature amount registered in the case database DB for the case image is referred to as a second feature amount. The first feature amount and the second feature amount are normalized so as to be equal to or greater than 0 and equal to or less than 1. In a case in which evaluation values for a plurality of findings in each pixel and feature amounts for each finding are acquired for the examination image V0, the examination image V0 is registered as a new case image in the case database DB. In this case, the evaluation value and the first feature amount for the examination image V0 are registered as the evaluation value and the second feature amount for a new case image in the case database DB.

The weighting coefficient setting unit 24 sets a weighting coefficient indicating the degree of weighting which varies depending on the size of each finding for each finding into which each pixel of the examination image V0 has been classified. The weighting coefficient is used for a weighting operation that is performed for the first feature amount for each finding calculated in the examination image V0 and the second feature amount for each finding which has been calculated in the case image in advance, that is, has been registered in the case database DB in the similarity derivation process which will be described below.

The features of a medical image are various. Therefore, in a case in which the feature amounts are not appropriately weighted considering the importance of the feature amounts in terms of medical images, the magnitude of the difference between the feature amounts does not correspond to the magnitude of the difference between the medical images and similarity deviates from the medical sense. Therefore, in a case in which the feature amounts are not appropriately weighted, in the search of a case image similar to the inspection image V0, the search results are likely to be arranged in the order of inappropriate similarities.

Here, in a case in which the same findings having almost the same size are present in the examination image V0 and the case image, two images are medically similar to each other. In addition, as the size of a finding region becomes larger, the finding is more important in terms of diagnosis. Therefore, the size of the finding is very important in determining the similarity between the images.

The findings include important findings, such as a punctate shadow that indicates the characteristics of the initial state of a disease even in a case in which it has a small size. In addition, as pulmonary emphysema occurs due to aging, slightly low absorption occurs in the lungs. However, the low-absorption findings are less important since they are more common in elderly patients. The low-absorption findings of the elderly persons are not so important even though the size of the findings is large.

Therefore, in a case in which the finding of the punctate shadow and the finding of low absorption of the elderly person are equally determined, a subtle difference in the low absorption area of a large region is larger than a difference in the punctate shadow. As a result, the similarity between the punctate shadows is buried in the similarity between the low density areas and it is difficult to search for a case image including a case of medically important punctate shadows.

Figures 6, 7:
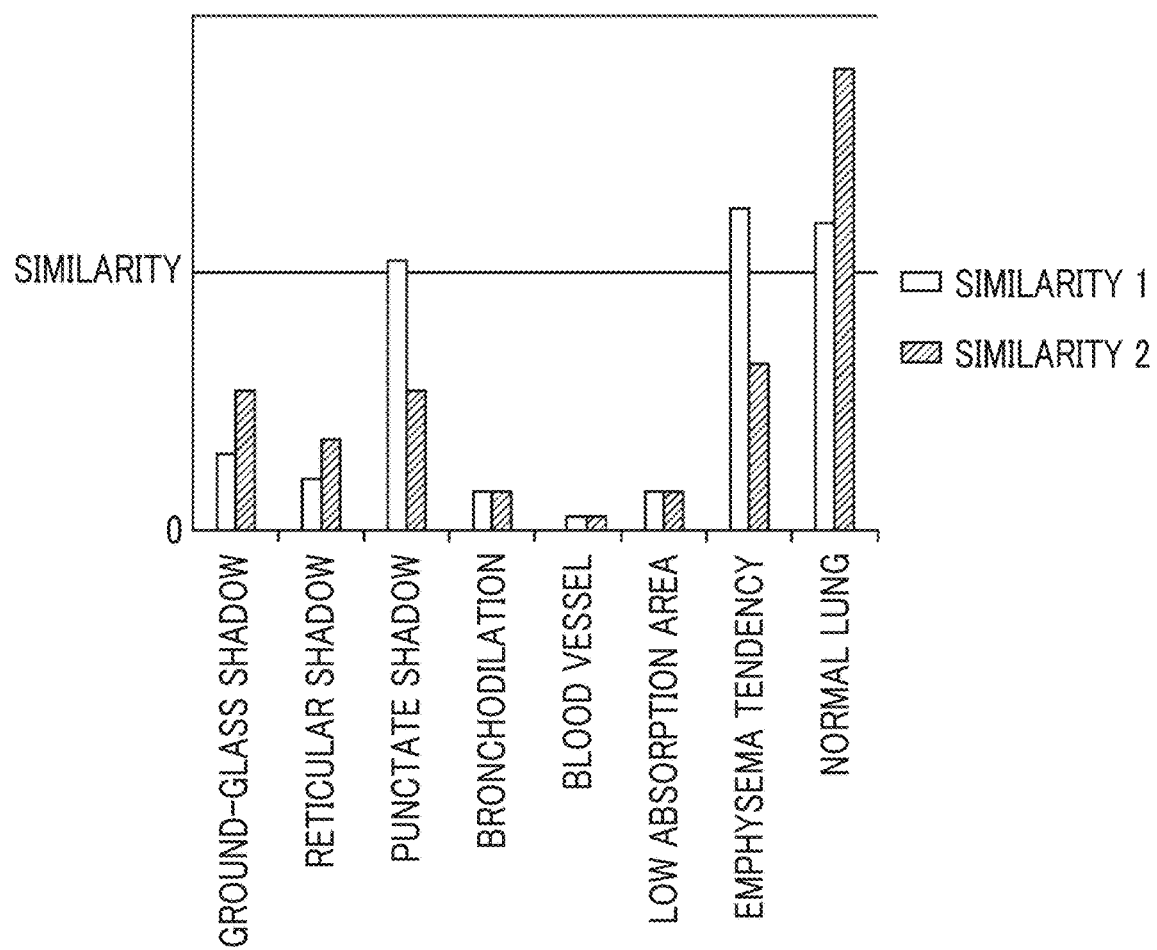
FIG. 6 is a diagram illustrating the calculation result of the volumes of findings.
FIG. 7 is a diagram illustrating the calculation result of similarity.

For this reason, in this embodiment, the weighting coefficient setting unit 24 sets a weighting coefficient indicating the degree of weight which varies depending on the size of each finding for each of a plurality of findings. A size feature amount included in the first feature amount calculated by the feature amount calculation unit 23 can be used as the size of the finding. Specifically, the volume of the finding can be used. Here, the volume of the finding can be calculated by multiplying the number of pixels of each finding included in the three-dimensional examination image V0 by the volume per voxel of the examination image V0. FIG. 6 illustrates the calculation results of the volume of the findings. In FIG. 6, the unit of volume is cubic millimeters. The size of the lung varies depending on the patient. Therefore, it is preferable to use, as the size of the finding, finding occupancy (=the volume of the finding/the volume of the lung) obtained by normalizing the volume of the finding with the volume of the organ, that is, the volume of the lung. In this embodiment, it is assumed that finding occupancy is used as the size of the finding. In addition, the finding occupancy may be included as the size feature amount in the first feature amount. In this case, the feature amount calculation unit 23 may calculate the finding occupancy.

The weighting coefficient setting unit 24 sets a weighting coefficient Wi for each finding of the examination image V0 using the following Expression (1). In Expression (1), i is the type of finding and fi is a function that has the occupancy Pvi of each finding in the examination image V0.

$$Wi = fi(Pvi) \quad (1)$$

Here, as illustrated in FIG. 6, the number of digits of the value of the volume is different between a finding with a large size and a finding with a small size. Therefore, it is preferable to reduce the dimensions, for example, by converting the finding occupancy, which is three-dimensional information, into two-dimensional finding occupancy using the function fi. In this case, the difference in the size of the finding is matched with the sense of the doctor. For this reason, as described above, it is preferable to nonlinearly convert a finding which has a small size, but is important using the function fi in order to increase the importance of the finding. Therefore, in this embodiment, the function fi is set as represented by the following Expression (2).

$$fi = a \cdot (b \cdot X + (1-b) \cdot X^c) \quad (2)$$

In Expression (2), a is a constant that determines a difference in the overall importance of each finding, c has a constant that has a value of 1 or less and determines the effect of emphasizing a finding with a small size, and b is a constant that determines the degree of the effect by the constant c. In addition, $X = (Pvi)^{2/3}$ is established. The finding occupancy Pvi is multiplied by 2/3 to convert the finding occupancy Pvi from a three-dimensional value to a two-dimensional value.

The weighting coefficient setting unit 24 sets the function represented by Expression (2) for each finding and applies the function to Expression (1) to set the weighting coefficient Wi for each of a plurality of types of findings.

The adjustment unit 25 adjusts a weighting coefficient for each of a plurality of finding groups, into which a plurality of types of findings are classified, to derive an adjusted weighting coefficient. Here, the findings include findings that are lesions, such as an infiltrative shadow, a mass shadow, and a ground-glass shadow, that is, abnormal findings and normal findings, such as the normal lung and mediastinum. The abnormal findings are important in determining the similarity between the examination image V0 and the case image. In contrast, emphysema tendency is an abnormal finding, is a common symptom in the elderly, and often do not require treatment. Therefore, the emphysema tendency is not so important in determining the similarity.

The punctate shadow is an important finding and the low absorption area is a wide range from only some small regions to the entire lung. Therefore, in a case in which the weighting coefficient Wi is set on the basis of only the size of the finding, it is difficult to balance the punctate shadow and the low absorption area in the determination of the similarity. In some cases, a plurality of findings are included in one lesion. In this case, it is preferable to adjust the weighting coefficient Wi as one lesion rather than to adjust the weighting coefficient Wi for each finding.

Therefore, in this embodiment, the adjustment unit 25 adjusts the weighting coefficient Wi corresponding to the size of the finding which has been set by the weighting coefficient setting unit 24 for each of a plurality of finding groups into which a plurality of types of findings are classified. Specifically, the adjustment unit 25 classifies a plurality of types of findings into a finding group (hereinafter, referred to as a background finding group) which becomes the background of, for example, the normal lung and emphysema tendency and a finding group (hereinafter, referred to as an important finding group) that becomes important findings, such as a punctate shadow, a ground glass shadow, and an infiltrative shadow, and adjusts the weighting coefficient Wi for each finding group. In addition, one or more findings are classified into each finding group.

In order to adjust the weighting coefficient Wi, first, the adjustment unit 25 calculates the sum Sum1 of weighting coefficients Wi1 for the background finding group and the sum Sum2 of weighting coefficients Wi2 for the important finding group using the following Expression (3). Instead of the sum, representative values, such as the mean, median, maximum value, and minimum value of the weighting coefficients Wi, may be used.

$$Sum1 = \Sigma Wi1$$

$$Sum2 = \Sigma Wi2 \quad (3)$$

The background finding group is not so important in determining similarity. Therefore, in this embodiment, the adjustment unit 25 sets an adjustment coefficient for determining the similarity such that the sum Sum1 is less than p times the sum Sum2. Here, p is a threshold value for adjusting the similarity and is, for example, ¼ in this embodiment. In this case, the adjustment unit 25 sets the adjustment coefficient for determining the similarity such that Sum1<(Sum2)/4 is satisfied. In a case in which Sum1 (Sum2)/4 is satisfied, the adjustment unit 25 does not set the adjustment coefficient. In a case in which Sum1<(Sum2)/4 is satisfied, the adjustment unit 25 sets an adjustment coefficient α1 for the background finding group and an adjustment coefficient α2 for the important finding group as represented by the following Expression (4).

$$\alpha1 = Sum2/(4 \times Sum1 + Sum2)$$

$$\alpha2 = 4 \times Sum1/(4 \times Sum1 + Sum2) \quad (4)$$

The adjustment unit 25 multiplies the weighting coefficient Wi1 for the finding belonging to the background finding group by the adjustment coefficient α1 to derive an adjusted weighting coefficient α1×Wi1. In addition, the adjustment unit 25 multiplies the weighting coefficient Wi2 for the finding belonging to the important finding group by the adjustment coefficient α2 to derive an adjusted weighting coefficient α2×Wi2.

The similarity derivation unit 26 performs a weighting operation for the first feature amount for each finding calculated in the examination image V0 and the second feature amount for each finding calculated in advance in the case image on the basis of the adjusted weighting coefficients α1×Wi1 and α2×Wi2 derived by the adjustment unit 25 to derive the similarity between the examination image V0 and the case image. In addition, the similarity derivation unit 26 derives the similarity between the examination image V0 and all of the case images registered in the case database DB.

Therefore, the similarity derivation unit 26 normalizes the first feature amount calculated for the examination image V0 to a value that is equal to greater than 0 and equal to or less than 1. Then, the similarity derivation unit 26 calculates a difference in the distance between the first feature amount and the second feature amount of the case image as a feature amount difference Ddi for each finding, as represented by the following Expression (5). In Expression (5), k indicates the type of feature amount, Tvk indicates the first feature amount for each type in the examination image V0, and Tck indicates the second feature amount for each type in the case image. The first feature amount and the second feature amount whose difference is calculated are the same type. In Expression (5), Σ indicates the calculation of the sum of (Tvk−Tck)$^2$ for each type of feature amount. Since the first feature amount and the second feature amount are normalized to a value that is equal to greater than 0 and equal to or less than 1, the feature amount difference Ddi is also a value that is equal to greater than 0 and equal to or less than 1. In a case in which the first feature amount Tvk is equal to the second feature amount Tck, the feature amount difference Ddi is 0. Instead of the difference in the distance between the first feature amount and the second feature amount, for example, the absolute value of the difference between the first feature amount and the second feature amount may be used.

$$Ddi=\sqrt{(\Sigma(Tvk-Tck)^2)} \quad (5)$$

Then, the similarity derivation unit 26 calculates a similarity S0 between the examination image V0 and the case image, using the adjusted weighting coefficients α1×Wi1 and α2×Wi2, as represented by the following Expression (6). That is, the similarity derivation unit 26 multiplies the adjusted weighting coefficient α1×Wi1 by the feature amount difference Ddi1 for each finding in the background finding group and adds the multiplication results for all of the findings. In addition, the similarity derivation unit 26 multiplies the adjusted weighting coefficient α2×Wi2 by the feature amount difference Ddi2 for each finding in the important finding group and adds the multiplication results for all of the findings. Then, the similarity derivation unit 26 adds the results of the weighting operation for the background finding group and the important finding group to calculate the similarity S0. In a case in which the similarity S0 is calculated using Expression (6), the distance between the first feature amount and the second feature amount becomes shorter, the similarity between the examination image V0 and the case image becomes higher. Therefore, a negative sign is given to Expression (6) such that, as the similarity between the examination image V0 and the case image becomes higher, the value of the similarity S0 becomes larger.

$$S0=-(\Sigma(\alpha 1 \times Wi1 \times Ddi1)+\Sigma(\alpha 2 \times Wi2 \times Ddi2)) \quad (6)$$

In addition, Expression (6) is synonymous with Expression (7). Therefore, the adjustment unit 25 may calculate only the adjustment coefficients α1 and α2 and the similarity derivation unit 26 may multiply the weighting operation result ΣWi1×Ddi1 for the background finding group by the adjustment coefficient α1, multiply the weighting operation result ΣWi2×Ddi2 for the important finding group by the adjustment coefficient α2, and add the multiplication results to derive the similarity S0.

$$S0=-(\alpha 1 \times \Sigma(Wi1 \times Ddi1)+\alpha 2 \times \Sigma(Wi2 \times Ddi2)) \quad (7)$$

In contrast, in a case in which the similarity is calculated by Expression (6) and the same findings have the same size, the similarity is 0. In a case in which the same lesions are compared with each other, the fact is that, as the size of the lesions becomes larger, the similarity between the lesions becomes higher. In a case in which the similarity is calculated by Expression (6), there is no difference between a case in which findings having a relatively large size are the same feature amount and a case in which findings having a relatively small size are the same feature amount and it is difficult to reflect the fact that, as the size of the lesions becomes larger, the similarity between the lesions becomes higher.

For this reason, for the same finding included in the examination image V0 and the case image, only the difference in size therebetween is not treated and it is preferable to increase the similarity as the sizes are similar to each other. Therefore, in this embodiment, the similarity derivation unit 26 further calculates a difference Dsi between the sizes of the findings in the examination image V0 and the case image, using the following Expression (8). In Expression (8), Pvi indicates the occupancy of a finding i in the examination image V0 and Pci indicates the occupancy of the finding i in the case image.

$$Dsi=1-|Pvi-Pci|/(Pvi+Pci) \quad (8)$$

Therefore, it is preferable that the similarity derivation unit 26 calculates a similarity S1 between the examination image V0 and the case image using the following Expression (9). Here, Ddi is a value that becomes larger as the similarity between the feature amounts of the findings in the examination image V0 and the case image becomes higher and Dsi is a value that becomes larger as the sizes of the findings in the examination image V0 and the case image becomes closer to each other. Therefore, it is possible to calculate the similarity that becomes higher as the examination image V0 and the case image become more similar to each other with Expression (9), considering the size of the same finding. Expression (9) is synonymous with Expression (10). In Expression (9) and Expression (10), Dsi1 is a difference in size in the background finding group and Dsi2 is a difference in size in the important finding group.

$$S1=\Sigma(1 \times Wi1 \times (Dsi1-Ddi1))+\Sigma(\alpha 2 \times Wi2 \times (Dsi2-Ddi2)) \quad (9)$$

$$S1=\alpha 1 \times \Sigma(Wi1 \times (Dsi1-Ddi1))+\alpha 2 \times \Sigma(Wi2 \times (Dsi2-Ddi2)) \quad (10)$$

In a case in which the similarity S1 is calculated by Expression (9), the maximum value of the similarity S1 varies depending on the examination image V0. Therefore, it is preferable to normalize the similarity S1 under the condition that the similarity S1 between the examination image V0 and the case image is the maximum, that is, the condition that there is no difference between the examination image V0 and the case image. Expression (11) normalizes the similarity S1 calculated by Expression (9) under the condition that the similarity S1 between the examination image V0 and the case image is the maximum. In Expression (11), S2 indicates the normalized similarity. In addition, Expression (11) is synonymous with Expression (12).

$$S2=(\Sigma(\alpha 1 \times Wi1 \times (Dsi1-Ddi1))+\Sigma(\alpha 2 \times Wi2 \times (Dsi2-Ddi2)))/\Sigma Wi \quad (11)$$

$$S2=(\alpha 1 \times \Sigma(Wi1 \times (Dsi1-Ddi1))+\alpha 2 \times \Sigma(Wi2 \times (Dsi2-Ddi2)))/\Sigma Wi \quad (12)$$

In contrast, in a case in which the similarity is calculated by Expression (6), it is preferable to normalize the similarity S0. Expression (13) is obtained by normalizing Expression (6) under the condition that the similarity S0 between the examination image V0 and the case image is the maximum.

In Expression (13), S3 indicates the normalized similarity. In addition, Expression (14) is synonymous with Expression (13).

$$S3=-(\Sigma(\alpha 1 \times Wi1 \times Ddi1)+\Sigma(\alpha 2 \times Wi2 \times Ddi2))/\Sigma Wi \quad (13)$$

$$S3=-(\alpha 1 \times \Sigma(Wi1 \times Ddi1)+\alpha 2 \times \Sigma(Wi2 \times Ddi2))/\Sigma Wi \quad (14)$$

Figures 8, 9:
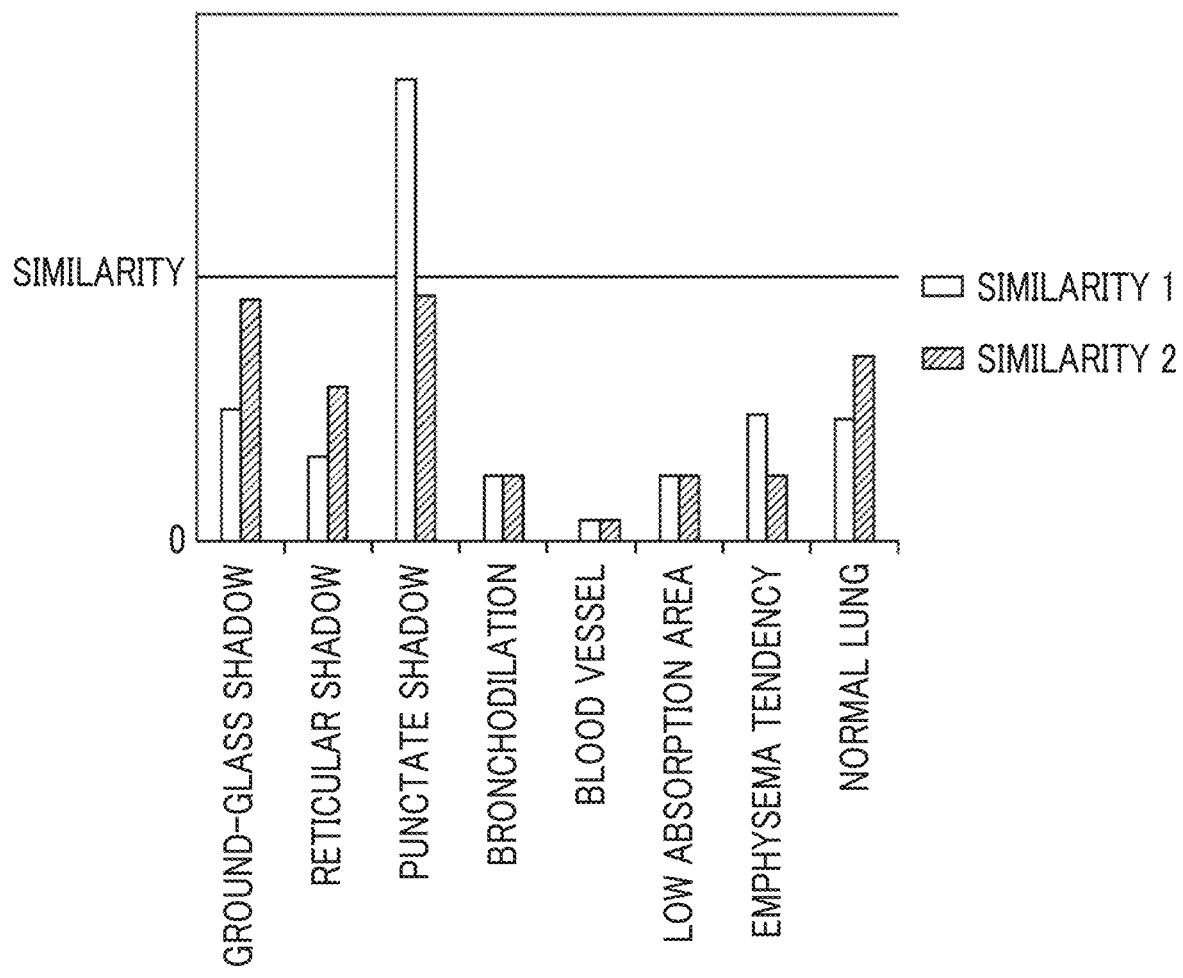
FIG. 8 is a diagram illustrating the calculation result of similarity.
FIG. 9 is a diagram illustrating a search result list.

FIG. 7 is a diagram illustrating the calculation result of the similarity in a case in which the weighting coefficient is not adjusted and FIG. 8 is a diagram illustrating the calculation result of the similarity in a case in which the weighting coefficient is adjusted. In FIGS. 7 and 8, similarity 1 indicates the similarity between the examination image V0 and a case image G1 and similarity 2 indicates the similarity between the examination image V0 and a case image G2 different from the case image G1. As illustrated in FIG. 7, in a case in which the weighting coefficient is not adjusted, both the similarities 1 and 2 are high for the normal lung and emphysema tendency belonging to the background finding group and the similarity between the examination image V0 and the case image G2 is higher than the similarity between the examination image V0 and the case image G1. In contrast, in a case in which the weighting coefficient Wi for each finding is adjusted as in this embodiment, both the similarities 1 and 2 are low for the normal lung and emphysema tendency belonging to the background finding group and are high for findings belonging to the abnormal finding group, such as a punctate shadow, a ground-glass shadow, and a reticular shadow. As a result, the similarity between the examination image V0 and the case image G1 is higher than the similarity between the examination image V0 and the case image G2. Therefore, according to this embodiment, it is possible to derive the similarity considering the findings belonging to the important finding group.

The search unit 27 performs a search process of searching for a case image similar to the examination image V0 as the similar case image from the case database DB on the basis of the similarity S2. First, the case database DB will be described.

A plurality of case images each of which includes one or more case slice images are registered in the case database DB. Specifically, as a result of the classification of findings for each of the plurality of case images, the feature amount (that is, the second feature amount) is registered so as to be associated with each of the plurality of case images. In this embodiment, in a case in which a new examination image V0 is acquired, the examination image V0 is registered as a new case image in the case database DB.

The search unit 27 searches for a case image similar to the examination image V0 as the similar case image on the basis of the similarities S2 between the examination image V0 and all of the case images registered in the case database DB. Specifically, the search unit 27 sorts the case images in descending order of the similarity S2 to create a search result list. FIG. 9 is a diagram illustrating the search result list. As illustrated in FIG. 9, the case images registered in the case database DB are sorted in descending order of the similarity S2 in a search result list L0. Then, the search unit 27 extracts a predetermined number of top case images sorted in the search result list L0 as the similar case images from the case database DB.

Figure 10:
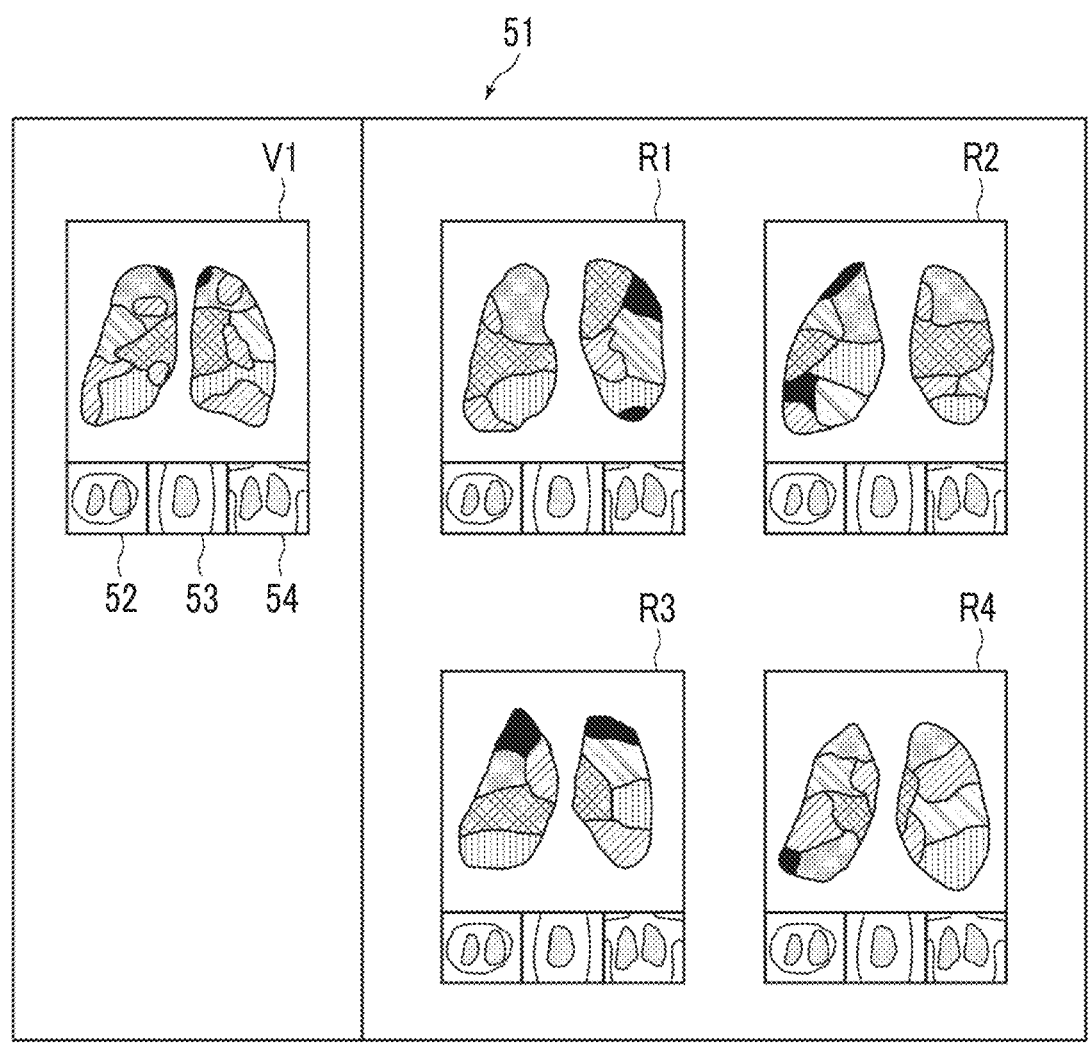
FIG. 10 is a diagram illustrating a search result.

The display control unit 28 displays the search result of the search unit 27 on the display unit 14. FIG. 10 is a diagram illustrating the search result. As illustrated in FIG. 10, a labeled examination image V1 and labeled similar case images R1 to R4 are displayed in the search result 51. Here, four similar case images R1 to R4 are displayed. However, five or more similar case images may be displayed.

In FIG. 10, the examination image V1 and the similar case images R1 to R4 are projection images projected by a predetermined projection method. In FIG. 10, only five types of labeling are illustrated for simplicity of description. However, in practice, images corresponding to the classified types of findings are labeled. Examination slice images 52 to 54 in three cross sections of an axial cross section, a sagittal cross section, and a coronal cross section are displayed below the examination image V1. In addition, case slice images of the same three cross sections as described above are displayed below each of the similar case images R1 to R4. The slice planes of the examination slice images 52 to 54 displayed below the examination image V1 and the case slice images displayed below the similar case images R1 to R4 can be switched by an operation from the input unit 15.

Figure 11:
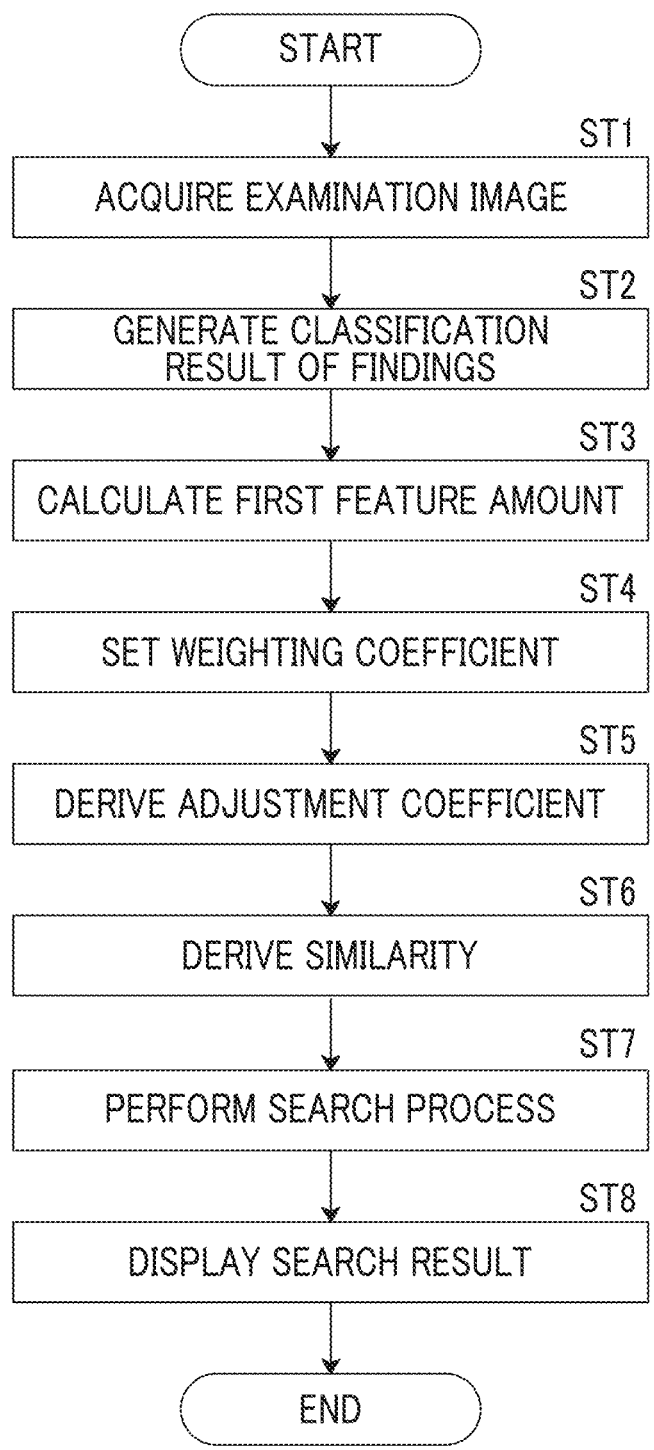
FIG. 11 is a flowchart illustrating a process performed in this embodiment.

Then, a process performed in this embodiment will be described. FIG. 11 is a flowchart illustrating the process performed in this embodiment. First, the image acquisition unit 21 acquires the examination image V0 (Step ST1). The finding classification unit 22 classifies a lung region included in the examination image V0 into a plurality of types of lesion regions indicating a plurality of types of findings and generates a finding classification result (Step ST2). Then, the feature amount calculation unit 23 calculates the first feature amount for each of the findings classified in the examination image V0 (Step ST3). The weighting coefficient setting unit 24 sets the weighting coefficient Wi for each finding of the examination image V0 (Step ST4).

Then, the adjustment unit 25 adjusts the weighting coefficient for each of a plurality of finding groups into which the plurality of types of findings are classified to derive the adjusted weighting coefficients α1×Wi1 and α2×Wi2 (Step ST5).

Then, the similarity derivation unit 26 performs a weighting operation for the first feature amount for each finding calculated in the examination image V0 and the second feature amount for each finding calculated in advance in the case image on the basis of the adjusted weighting coefficients α1×Wi1 and α2×Wi2 to derive the similarity between the examination image V0 and the case image (Step ST6). As described above, the similarity derivation unit 26 derives the similarities between the examination image V0 and all of the case images registered in the case database DB. The search unit 27 performs a search process on the basis of the similarities (Step ST7). The display control unit 28 displays the search result on the display unit 14 (Step ST8). Then, the process ends.

As such, according to this embodiment, a plurality of evaluation values indicating the possibility of each pixel of the examination image V0 being each of a plurality of types of findings are calculated and each pixel of the examination image V0 is classified into at least one of the plurality of types of findings on the basis of the plurality of evaluation values. In addition, the first feature amount is calculated for each of the findings classified in the examination image V0. A weighting coefficient indicating the degree of weighting which varies depending on the size of each finding is set for each of the findings classified in the examination image V0. The weighting coefficient is adjusted for each of a plurality of finding groups, into which the plurality of types of findings are classified, to derive an adjusted weighting coefficient. Then, the weighting operation is performed for the first feature amount for each finding calculated in the examination image V0 and the second feature amount for each finding calculated in advance in the case image on the basis of the adjusted weighting coefficient derive the similarity between the examination image V0 and the case image. According to this embodiment, as such, the weighting coefficient indicating the degree of weighting which varies depending on the size of each finding is set and the weighting coefficient is adjusted for each finding group. Therefore, it is possible to appropriately determine the similarity between the examination image V0 and the case image on the basis of the size and type of findings included in the examination image V0 and the case image.

Figure 12:
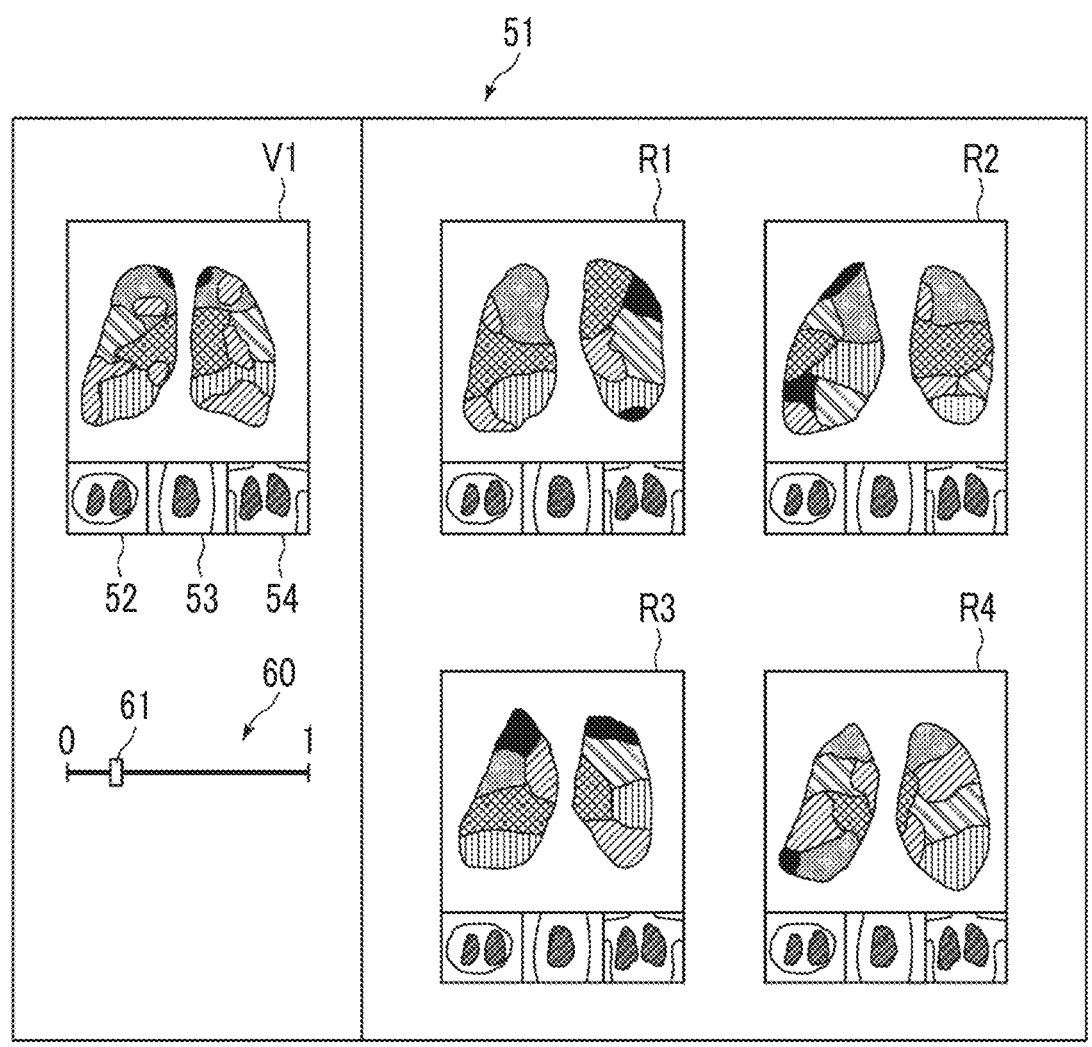
FIG. 12 is a diagram illustrating a search result including a slider.

In the above-described embodiment, the threshold value p for adjusting the similarity is ¼. However, the value of the threshold value p may be changed. For example, as illustrated in FIG. 12, a slider 60 for changing the threshold value p may be included in the search result 51 and a knob 61 of the slider 60 may be moved by the input unit 15 to adjust the threshold value p. In addition, the slider 60 may be displayed on the display unit 14 separately from the search result 51. Further, a method for changing the threshold value p is not limited to the slider. For example, a numerical value may be directly input.

Here, the following situation is considered as a situation in which the similar case image is searched. First, a situation is considered in which a search is performed while keeping the balance between background and important findings. Specifically, a situation is considered in which the doctor who performs a search checks the presence of the background and a disease of interest in the examination image V0 and wants to search for a case image that includes a background similar to the background of the examination image V0 and a finding corresponding to a disease similar to the disease of interest to refer to a medical treatment. Further, there is a situation in which the doctor searches for a similar case image before interpreting the examination image V0 in detail, reviews the examination image V0 to reconfirm the findings from the viewpoint of the disease based on the findings included in the obtained similar case image or detects the findings that have not been detected in the first interpretation. In this situation, for example, the threshold value p may be about ¼ as in the above-described embodiment.

In addition, a situation in which the background is not used as a search condition is considered as the situation in which similar case images are searched. For example, in the examination image V0 including a rare disease and a background disease, such as emphysema, a similar case image may not exist. In this case, it is preferable to further reduce the threshold value p to reduce the importance of the background, to determine similarity on the basis of an important finding as the main object, and to search for similar case images.

A situation in which a search is performed on the basis of the background as the main object is given as an example of the situation in which similar case images are searched. For example, even in a case in which the examination image V0 includes a lesion other than the background, if the disease of interest in the examination image V0 is emphysema, it is necessary to search for a case image in which the state of emphysema is similar to the examination image V0. In this case, it is preferable to further increase the threshold value p in order to improve the accuracy of searching for the background.

The configuration in which the threshold value p can be changed makes it possible to search for an appropriate similar case image even in the above-mentioned various situations.

In the above-described embodiment, a plurality of types of findings are classified into the background finding group and the important finding group. For example, the findings to which attention is paid are different in cancer and other diffuse diseases among lung diseases. Therefore, it is preferable to further classify important findings into a plurality of types of finding groups in consideration of the properties of findings. For example, a plurality of types of findings may be classified into three or more finding groups, such as a background finding group, a mass and nodule finding group, and other finding group. In addition, the classification of the finding groups is not limited thereto. For example, any finding group, such as a finding group including findings peculiar to the disease of interest, may be created. In this case, a configuration may be used which enables the operator to create a desired finding group with the input unit 15.

In the above-described embodiment, emphysema is classified into the background finding group. However, there are various types of emphysema. For example, centrilobular emphysema showing a relatively early state is relatively close to the normal. However, for example, since panlobular emphysema is in an advanced state, it requires attention as a disease. As such, even if the emphysema is the same, there is a difference in importance as a disease. Therefore, in some cases, emphysema may not be necessarily uniformly classified into the background finding group.

Therefore, for one finding, it is preferable to perform weighting according to relevance to the background finding group and the important finding group and to adjust the weighting coefficient. For example, for emphysema, preferably, the finding classification unit 22 can further classify emphysema into panlobular emphysema and centrilobular emphysema. In a case in which the weighting coefficient setting unit 24 calculates the sum Sum1 of the weighting coefficients Wi1 for the background finding group and the sum Sum2 of the weighting coefficients Wi2 for the important finding group as illustrated in the following Expression (15), preferably, the weighting coefficient setting unit 24 can set weights for the weighting coefficient W11 for panlobular emphysema and the weighting coefficient W12 for centrilobular emphysema and can adjust the weighting coefficients Wi.

In this case, for panlobular emphysema, the difference between weights for the background and an important finding may be 0.5. For centrilobular emphysema, a weight for the background may be 0.9 and a weight for an important finding may be 0.1. In addition, instead of the ratio of the background to the important finding, the weighting coefficient Wi may be compared with a threshold value and the sum of the weighting coefficients Wi may be calculated assuming that all of the findings, for which the weighting coefficient Wi less than the threshold value has been calculated, belong to the background finding group. In addition, for the findings for which the weighting coefficients Wi equal to or greater than the threshold value have been calculated, findings corresponding to the proportion of weighting coefficients greater than the threshold value to the weighting coefficients Wi may be assigned to the important finding group and the sum of the weighting coefficients Wi may be calculated as in Expression (15).

$$\text{Sum1} = \Sigma W_{i1} = (0.5 \times W_{11} + 0.9 \times W_{12} + \ldots)$$

$$\text{Sum2} = \Sigma W_{i2} = (0.5 \times W_{11} + 0.1 \times W_{12} + \ldots) \quad (15)$$

In this case, the calculation of the similarity S1 by Expression (9) is considered. In this case, a term for emphysema is excluded from the first term on the right side of Expression (9), that is, a term for calculating similarity for the background finding group and similarity S11 in the following Expression (16) is added instead of the excluded term. In Expression (16), each of Ds11_1 and Ds12_1 is a difference in size between panlobular emphysema and centrilobular emphysema and each of Dd11_1 and Dd12_1 is a difference in feature amount between panlobular emphysema and centrilobular emphysema.

$$S11 = (0.5 \times \alpha 1 + 0.5 \times \alpha 2) \times Wi11 \times (Ds11\_1 - Dd11\_1) + (0.9 \times \alpha 1 + 0.1 \times \alpha 2) \times Wi12 \times (Ds12\_1 - Dd12\_1) \quad (16)$$

In each of the above-described embodiments, a plurality of evaluation values indicating the possibility of each pixel of the examination image V0 being each of a plurality of types of findings are calculated and each pixel of the examination image V0 is classified into at least one of the plurality of types of findings on the basis of the plurality of evaluation values. However, a finding classification method is not limited to the method using the evaluation value.

In each of the above-described embodiments, the case database DB is stored in the image storage server 3. However, the case database DB may be stored in the storage 13.

In each of the above-described embodiments, the examination image is registered in the case database DB. However, images other than the examination image may be registered as registration target images in the case database.

In each of the above-described embodiments, for example, the following various processors can be used as the hardware structure of processing units performing various processes, such as the image acquisition unit 21, the finding classification unit 22, the feature amount calculation unit 23, the weighting coefficient setting unit 24, the adjustment unit 25, the similarity derivation unit 26, the search unit 27, and the display control unit 28. The various processors include a CPU which is a general-purpose processor executing software (program) to function as various processing units as described above, a programmable logic device (PLD), such as a field programmable gate array (FPGA), which is a processor whose circuit configuration can be changed after manufacture, and a dedicated electric circuit, such as an application specific integrated circuit (ASIC), which is a processor having a dedicated circuit configuration designed to perform a specific process.

One processing unit may be configured by one of the various processors or a combination of two or more processors of the same type or different types (for example, a combination of a plurality of FPGAs and a combination of a CPU and an FPGA). In addition, a plurality of processing units may be configured by one processor.

A first example of the configuration in which a plurality of processing units are configured by one processor is an aspect in which one processor is configured by a combination of one or more CPUs and software and functions as a plurality of processing units. A representative example of this aspect is a client computer or a server computer. A second example of the configuration is an aspect in which a processor that implements the functions of the entire system including a plurality of processing units using one integrated circuit (IC) chip is used. A representative example of this aspect is a system-on-chip (SoC). As such, various processing units are configured by using one or more of the various processors as a hardware structure.

In addition, specifically, an electric circuit (circuitry) obtained by combining circuit elements, such as semiconductor elements, can be used as the hardware structure of the various processors.

EXPLANATION OF REFERENCES

1: similarity determination apparatus
2: three-dimensional imaging apparatus
3: image storage server
4: network
11: CPU
12: memory
13: storage
14: display unit
15: input unit
21: image acquisition unit
22: finding classification unit
23: feature amount calculation unit
24: weighting coefficient setting unit
25: adjustment unit
26: similarity derivation unit
27: search unit
28: display control unit
40: multi-layer neural network
41: input layer
42: output layer
51: search result
52 to 54: examination slice image
60: slider
61: knob
DB: case database
L0: examination list
R1 to R4: similar case image
V0, V1: examination image

What is claimed is:

1. A similarity determination apparatus that determines a similarity between a first medical image and a second medical image, comprising
   a processor configured to:
      classify each pixel of the first medical image into at least one of a plurality of types of findings;
      calculate a first feature amount for each finding classified in the first medical image;
      set a weighting coefficient indicating a degree of weighting which varies depending on a size of each finding for each finding classified in the first medical image;
      derive an adjusted weighting coefficient by adjusting the weighting coefficient for each of a plurality of finding groups, into which the plurality of types of findings are classified; and
   derive the similarity between the first medical image and the second medical image by performing a weighting operation for the first feature amount for each finding calculated in the first medical image and a second feature amount for each finding calculated in advance in the second medical image, for each of the finding groups on the basis of the adjusted weighting coefficient.

2. The similarity determination apparatus according to claim 1,
   the processor is configured to adjust the weighting coefficient on the basis of a representative value of the weighting coefficients, which have been set for each classification, for each finding group.

3. The similarity determination apparatus according to claim 2,
   wherein the representative value is a sum of the weighting coefficients, which have been set for each classification, for each finding group.

4. The similarity determination apparatus according to claim 1,
   the processor is configured to adjust the weighting coefficient in response to a command to change a degree of adjustment of the weighting coefficient.

5. The similarity determination apparatus according to claim 2,
the processor is configured to adjust the weighting coefficient in response to a command to change a degree of adjustment of the weighting coefficient.

6. The similarity determination apparatus according to claim 3,
the processor is configured to adjust the weighting coefficient in response to a command to change a degree of adjustment of the weighting coefficient.

7. The similarity determination apparatus according to claim 4,
the processor is configured to receive a command to change the weighting coefficient displayed on a display unit and adjust the weighting coefficient.

8. The similarity determination apparatus according to claim 7,
wherein the command to change the weighting coefficient is input to a slider displayed on the display unit.

9. The similarity determination apparatus according to claim 1,
wherein the plurality of finding groups include a finding group that becomes a background included in the first medical image and a finding group that becomes an important finding included in the first medical image.

10. The similarity determination apparatus according to claim 2,
wherein the plurality of finding groups include a finding group that becomes a background included in the first medical image and a finding group that becomes an important finding included in the first medical image.

11. The similarity determination apparatus according to claim 1,
wherein the plurality of types of findings include at least one specific finding that is classified into two or more finding groups, and
the processor is configured to perform weighting corresponding to relevance to the two or more finding groups for the specific finding to adjust the weighting coefficient.

12. The similarity determination apparatus according to claim 2,
wherein the plurality of types of findings include at least one specific finding that is classified into two or more finding groups, and
the processor is configured to perform weighting corresponding to relevance to the two or more finding groups for the specific finding to adjust the weighting coefficient.

13. The similarity determination apparatus according to claim 1,
wherein the processor comprises a discriminator that has been subjected to machine learning so as to classify the plurality of types of findings and classifies each pixel of the first medical image into the plurality of types of findings using the discriminator.

14. The similarity determination apparatus according to claim 2,
wherein the processor comprises a discriminator that has been subjected to machine learning so as to classify the plurality of types of findings and classifies each pixel of the first medical image into the plurality of types of findings using the discriminator.

15. The similarity determination apparatus according to claim 1,
the processor is configured to search for a second medical image similar to the first medical image as a similar medical image on the basis of similarities between the first medical image and a plurality of the second medical images with reference to a case database in which the plurality of second medical images are registered and the second feature amounts for each of the plurality of second medical images are registered so as to be associated with the plurality of second medical images.

16. The similarity determination apparatus according to claim 15, the processor is configured to control to display a search result of the similar medical image on the display unit.

17. The similarity determination apparatus according to claim 1,
the processor is configured to calculate a plurality of evaluation values indicating a possibility of each pixel of the first medical image being each of the plurality of types of findings and classify each pixel of the first medical image into at least one of the plurality of types of findings on the basis of the plurality of evaluation values.

18. A similarity determination method that determines a similarity between a first medical image and a second medical image, the method comprising:
classifying each pixel of the first medical image into at least one of a plurality of types of findings;
calculating a first feature amount for each finding classified in the first medical image;
setting a weighting coefficient indicating a degree of weighting which varies depending on a size of each finding for each finding classified in the first medical image;
deriving an adjusted weighting coefficient by adjusting the weighting coefficient for each of a plurality of finding groups, into which the plurality of types of findings are classified; and
deriving the similarity between the first medical image and the second medical image by performing a weighting operation for the first feature amount for each finding calculated in the first medical image and a second feature amount for each finding calculated in advance in the second medical image, for each of the finding groups on the basis of the adjusted weighting coefficient.

19. A non-transitory computer recording medium storing a similarity determination program that causes a computer to perform a process of determining a similarity between a first medical image and a second medical image and to perform:
classifying each pixel of the first medical image into at least one of a plurality of types of findings;
calculating a first feature amount for each finding classified in the first medical image;
setting a weighting coefficient indicating a degree of weighting which varies depending on a size of each finding for each finding classified in the first medical image;
deriving an adjusted weighting coefficient by adjusting the weighting coefficient for each of a plurality of finding groups, into which the plurality of types of findings are classified; and
deriving the similarity between the first medical image and the second medical image by performing a weighting operation for the first feature amount for each finding calculated in the first medical image and a second feature amount for each finding calculated in advance in the second medical image, for each of the finding groups on the basis of the adjusted weighting coefficient.

* * * * *